(12) United States Patent
Bhardwaj et al.

(10) Patent No.: US 12,224,486 B2
(45) Date of Patent: Feb. 11, 2025

(54) APPARATUS, SYSTEM, AND METHOD FOR SWAPPABLE ANTENNA DESIGN

(71) Applicant: META PLATFORMS TECHNOLOGIES, LLC, Menlo Park, CA (US)

(72) Inventors: Rahul Bhardwaj, Sammamish, WA (US); Javier Rodriguez De Luis, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 174 days.

(21) Appl. No.: 17/743,744

(22) Filed: May 13, 2022

(65) Prior Publication Data

US 2023/0369748 A1 Nov. 16, 2023

(51) Int. Cl.
*H01Q 1/27* (2006.01)
*G06F 1/16* (2006.01)

(52) U.S. Cl.
CPC ............. *H01Q 1/273* (2013.01); *G06F 1/163* (2013.01)

(58) Field of Classification Search
CPC .......... H01Q 1/273; H01Q 1/38; G06F 1/163; G06F 1/16; G02B 27/0176; H05K 1/144; H05K 5/0004; H05K 9/0005; H05K 2201/048
See application file for complete search history.

(56) References Cited

U.S. PATENT DOCUMENTS

| | | | |
|---|---|---|---|
| 7,495,618 B2 * | 2/2009 | Kurashima | H01Q 1/242 343/846 |
| 9,419,326 B2 * | 8/2016 | Han | B29C 45/14065 |
| 2008/0079638 A1 * | 4/2008 | Choi | H01Q 1/245 343/702 |
| 2009/0015490 A1 * | 1/2009 | Honda | H01Q 9/30 343/702 |
| 2009/0251373 A1 * | 10/2009 | Degner | H01R 35/04 343/702 |
| 2010/0271265 A1 * | 10/2010 | Sung | H01Q 1/40 425/577 |
| 2011/0221639 A1 * | 9/2011 | Jeon | H01Q 9/0421 343/702 |
| 2013/0194141 A1 * | 8/2013 | Okajima | H04B 1/385 343/718 |
| 2014/0262875 A1 * | 9/2014 | Carnevali | H04M 1/0283 206/320 |
| 2017/0179580 A1 * | 6/2017 | Park | H01Q 5/371 |
| 2018/0098448 A1 * | 4/2018 | Baek | H05K 5/0217 |

(Continued)

OTHER PUBLICATIONS

Taoglas, "LDS Antenna Technology," Retrieved from Internet: URL: https://www.taoglas.com/, retrieved on Apr. 29, 2022, 3 pages.

*Primary Examiner* — Dameon E Levi
*Assistant Examiner* — Leah Rosenberg
(74) *Attorney, Agent, or Firm* — Greenberg Traurig, LLP

(57) ABSTRACT

The disclosed swappable antenna component may include a carrier dimensioned to fit to an interior of an overmold window, wherein the overmold window may be overmolded to a gap of a frame of a computing device. Additionally, the swappable antenna component may include an antenna trace disposed in a conductive layer of the carrier to electronically couple to the computing device, wherein the antenna trace may be surrounded by a non-conductive material of the carrier. Various other apparatuses, systems, and methods are also disclosed.

11 Claims, 10 Drawing Sheets

(56) References Cited

U.S. PATENT DOCUMENTS

| | | | | |
|---|---|---|---|---|
| 2020/0367386 A1* | 11/2020 | Kim | ................... | H05K 7/20436 |
| 2021/0399405 A1* | 12/2021 | Hintermann | .......... | G06F 1/1698 |
| 2022/0294100 A1* | 9/2022 | Zhang | ................ | H01Q 15/0066 |

* cited by examiner

APPARATUS, SYSTEM, AND METHOD FOR SWAPPABLE ANTENNA DESIGN

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
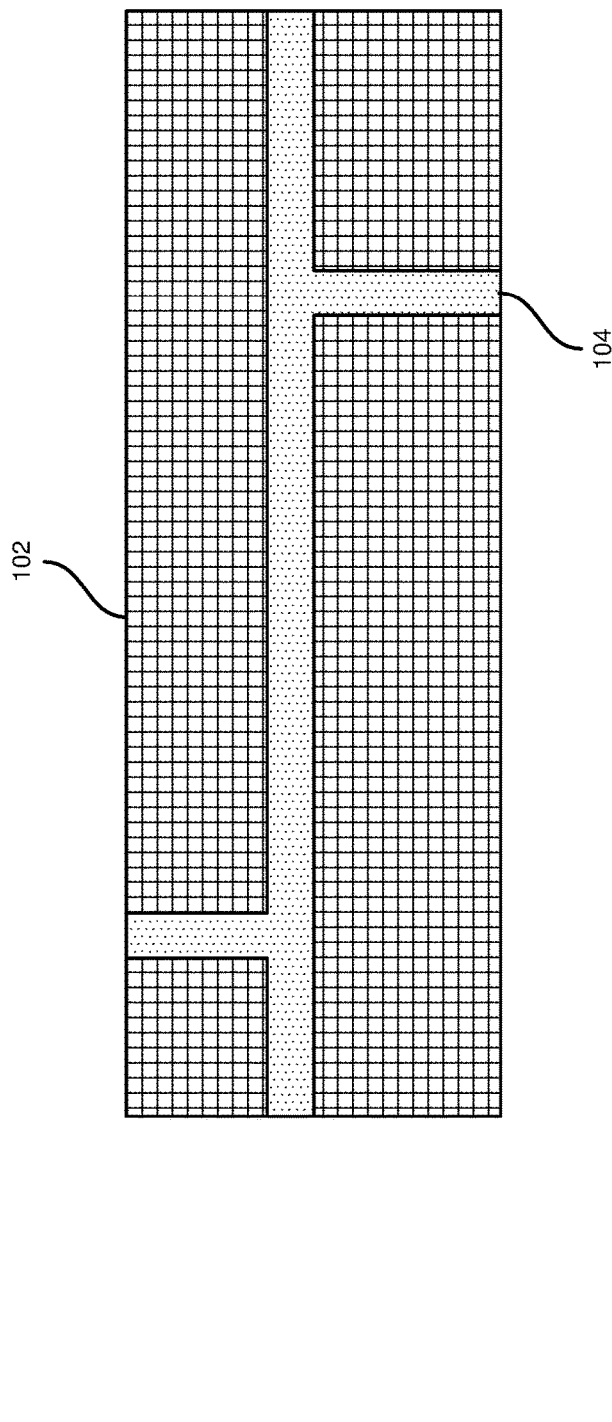
FIG. 1 is an illustration of an exemplary swappable antenna component.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Computing devices may use various types of antennas to send and receive signals, enabling the devices to communicate with other electronic devices. Antennas for consumer electronics often require both conductive as well as non-conductive zones, and both need to be integrated into a single structure. For example, a conductive layer may be needed to transmit a signal, but a keep-out zone may also be needed to avoid signal interference or to protect users from electronic signals.

Some methods of integrating an antenna may etch the antenna pattern directly into the computing device and molding plastic around the etched pattern. Such methods, however, may require a new frame or chassis any time the antenna is redesigned. These methods restrict design flexibility of the overall device and may restrict antenna designs to those that can be easily etched into the device.

Other methods may bond a separate antenna component to the computing device. However, bonding the separate component to the outer perimeter of a device may cause sealing or cosmetic seam issues. For example, if a separate antenna insert is glued to the device, an outer seam may be visible and may cause potential water and dust ingress to the device. Additionally, by attaching the insert to the device, the conductive components of the antenna may stick to any metallic components of the computing device, possibly creating additional issues with conductivity and signal detection. Thus, better methods of integrating antennas into computing devices are needed to enable flexible design.

The present disclosure is generally directed to an apparatus, system, and method for swappable antenna design. As will be explained in greater detail below, embodiments of the present disclosure may, by inserting a separate antenna component into a computing device, the disclosed method may enable subsequent changes to the design of the antenna. For example, by laser-sintering an antenna into an injection-molded component, the disclosed method may more efficiently provide new antenna designs. By overmolding a non-conductive material to the outside of the device, the disclosed method may apply the overmolded component to eliminate potential seams and protect interior components against water or dust. For example, an overmold window may be directly molded to a gap in a frame of a pair of artificial reality glasses, and putty or other malleable material may be applied to further cover any remaining seams. By bonding to an inside surface of an overmold window, the antenna component may then be protected by the overmold window. Thus, the apparatuses, systems, and methods disclosed herein may improve over other methods of integrating an antenna to a computing device to enable design flexibility while maintaining seals to protect the antennas.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIG. 1, detailed descriptions of an exemplary swappable antenna component. Detailed descriptions of an exemplary overmold window will be provided in connection with FIG. 2. In addition, detailed descriptions of a computing device incorporating the exemplary swappable antenna component and the exemplary overmold window will be provided in connection with FIGS. 3-4 and 6-7. Detailed descriptions of swapping between exemplary swappable antenna components will then be provided in connection with FIG. 5. Furthermore, detailed descriptions of an exemplary method for manufacturing the exemplary swappable antenna component will be provided in connection with FIG. 8. Finally, detailed descriptions of exemplary augmented-reality and virtual-reality systems that may incorporate coil-integrated housing components will be provided in connection with FIGS. 9 and 10.

FIG. 1 illustrates an exemplary swappable antenna component 100. As illustrated in FIG. 1, an antenna trace 104 may be disposed in a conductive layer of a carrier 102. As used herein, the term "carrier" may refer to a component acting as a base to hold an antenna for ease of transport and design, such as a molded plastic component with an antenna trace. In some examples, antenna trace 104 of swappable antenna component 100 may include a conductive material shaped to function as an antenna to transmit or receive electromagnetic signals for a computing device. In these examples, antenna trace 104 may be surrounded by a non-conductive material of carrier 102.

As used herein, the term "antenna trace" may refer to an antenna of conductive material embedded as a designed path, such as an etched copper trace on a printed circuit board. In this example, the conductive layer of carrier 102 may represent a layer of copper surrounded by the non-conductive material. In some examples, the non-conductive material of carrier 102 may include a type of plastic or resin polymer. In these examples, conductive antenna trace 104 may be extruded from the conductive layer of carrier 102, and the non-conductive material may be molded around antenna trace 104 to create a "keep out zone" to better direct signals to and/or from antenna trace 104.

Figure 2:
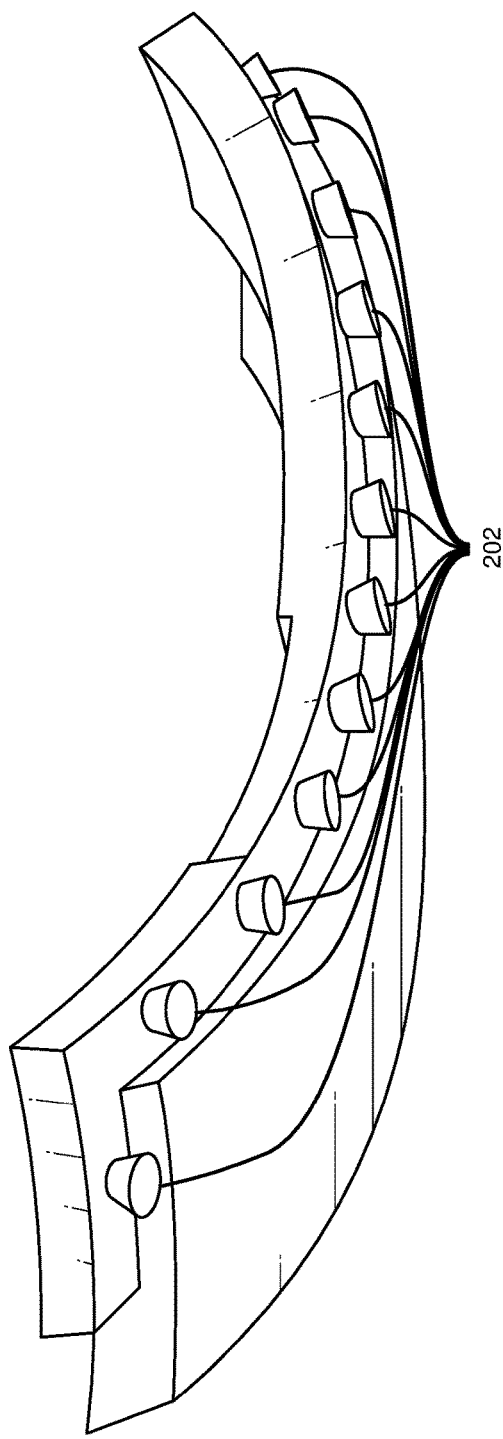
FIG. 2 is a perspective view of an exemplary overmold window.

FIG. 2 illustrates a perspective view of an exemplary overmold window 200. In one example, the term "overmolding" may refer to a process of manufacturing a component by injecting a substantially fluid substance into a mold around a preformed component and curing or hardening the substance to hold a specific shape. For example, overmold window 200 may be overmolded to a gap of a frame of the computing device. Additionally, in some examples, overmold window 200 may be molded to contain an interior space, or window, sized to hold carrier 102 of FIG. 1

In some embodiments, overmold window 200 may include one or more interlocking elements dimensioned to increase a structural bond with the frame of the computing device. For example, as illustrated in FIG. 2, a number of interlocking elements 202 may extend from overmold window 200 to fill holes or divots in the frame of the computing device when overmold window 200 is overmolded to the frame.

Figure 3:
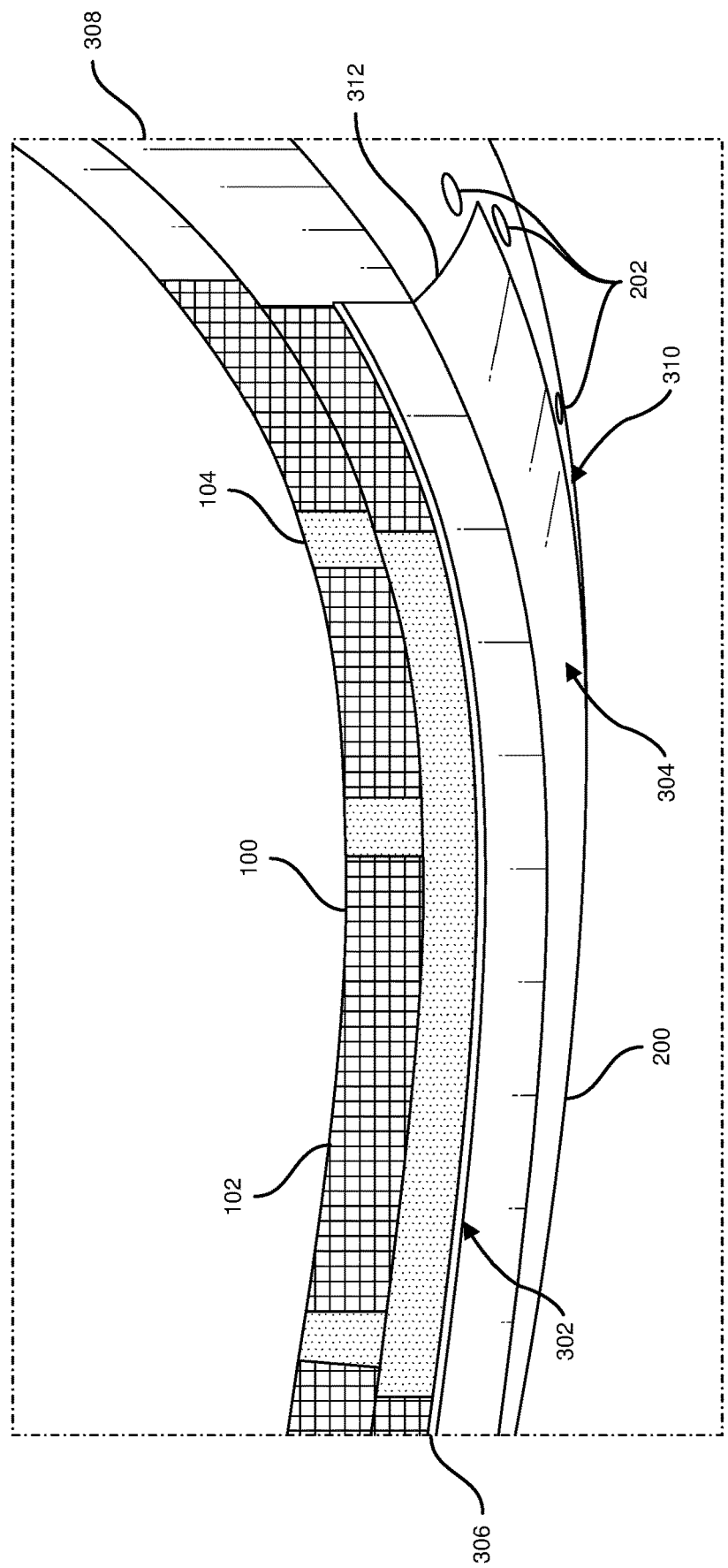
FIG. 3 is an illustration of an exemplary swappable antenna component bonded to the exemplary overmold window overmolded to an exemplary frame.

FIG. 3 illustrates an exemplary swappable antenna component 100 bonded to overmold window 200, which is overmolded to an exemplary frame 308. In this example, swappable antenna component 100 may include carrier 102, which may be dimensioned to fit to an interior of overmold window 200. The swappable antenna component 100 may also include antenna trace 104 disposed on carrier 102. In some examples, carrier 102 and, therefore, swappable antenna component 100 may be dimensioned to fit to the interior of overmold window 200 such that carrier 102 and swappable antenna component 100 fit within the gap of frame 308 and are covered by overmold window 200.

In one example, carrier 102 may include a non-conductive material injection molded to fit the interior of overmold window 200. As used herein, the terms "injection molding" and "insert molding" may refer to a process of manufacturing components by injecting a substantially fluid substance into a mold or hollow cast and curing or hardening the substance to hold a shape. For example, swappable antenna component 100 may represent a laser direct structuring or laser direct sintering (LDS) insert with integrated antenna trace 104 laser-traced to an injection-molded carrier 102, and the LDS insert may be molded to fit inside overmold window 200.

In one embodiment, overmold window 200 may be overmolded to a gap of frame 308 such that an exterior surface 304 of overmold window 200 is flush with an exterior surface 310 of frame 308. As illustrated in FIG. 3, overmold window 200 may be molded into a shape consistent with the shape of frame 308 to fill in the gap in frame 308. Additionally, interlocking elements 202 of overmold window 200 may increase the structural bond of overmold window 200 with frame 308 by filling the matching elements of frame 308. For example, a mold for overmold window 200 may encompass frame 308 and may be injected with a liquid polymer that fills the mold and the interlocking holes of frame 308 to create overmold window 200. After the polymer is cured into a solid substance, interlocking elements 202 may be physically locked to frame 308 such that overmold window 200 is not easily removed.

In some embodiments, swappable antenna component 100 may be bonded to an interior surface 302 of overmold window 200 with a liquid adhesive 306. In these embodiments, liquid adhesive 306 may represent a liquid dispensed adhesive, such as a type of glue, or any other type of bonding or adhesive material. In these embodiments, overmold window 200 may first be overmolded onto frame 308 and liquid adhesive 306 may then bond swappable antenna component 100 to interior surface 302 of overmold window 200. As illustrated in FIG. 3, liquid adhesive 306 may be applied as a thin layer between swappable antenna component 100 and overmold window 200. Additionally, swappable antenna component 100 may be bonded to interior surface 302 of overmold window 200 such that the bonding eliminates a seam along exterior surface 310 of frame 308. For example, by bonding swappable antenna component 100 to interior surface 302 rather than externally applying swappable antenna component 100 to frame 308, the bonding eliminates a potential external seam that would cause an ingress path to swappable antenna component 100.

In some examples, a pliable material may be applied to overmold window 200 to reduce a seam 312 between overmold window 200 and frame 308. For example, the pliable material may include a malleable putty material that may be spread over seam 312. In these examples, overmolding overmold window 200 to frame 308 may initially reduce potential exposure from water or dust ingress, and the putty substance may be applied to seam 312 to further reduce the potential ingress.

Figure 4:
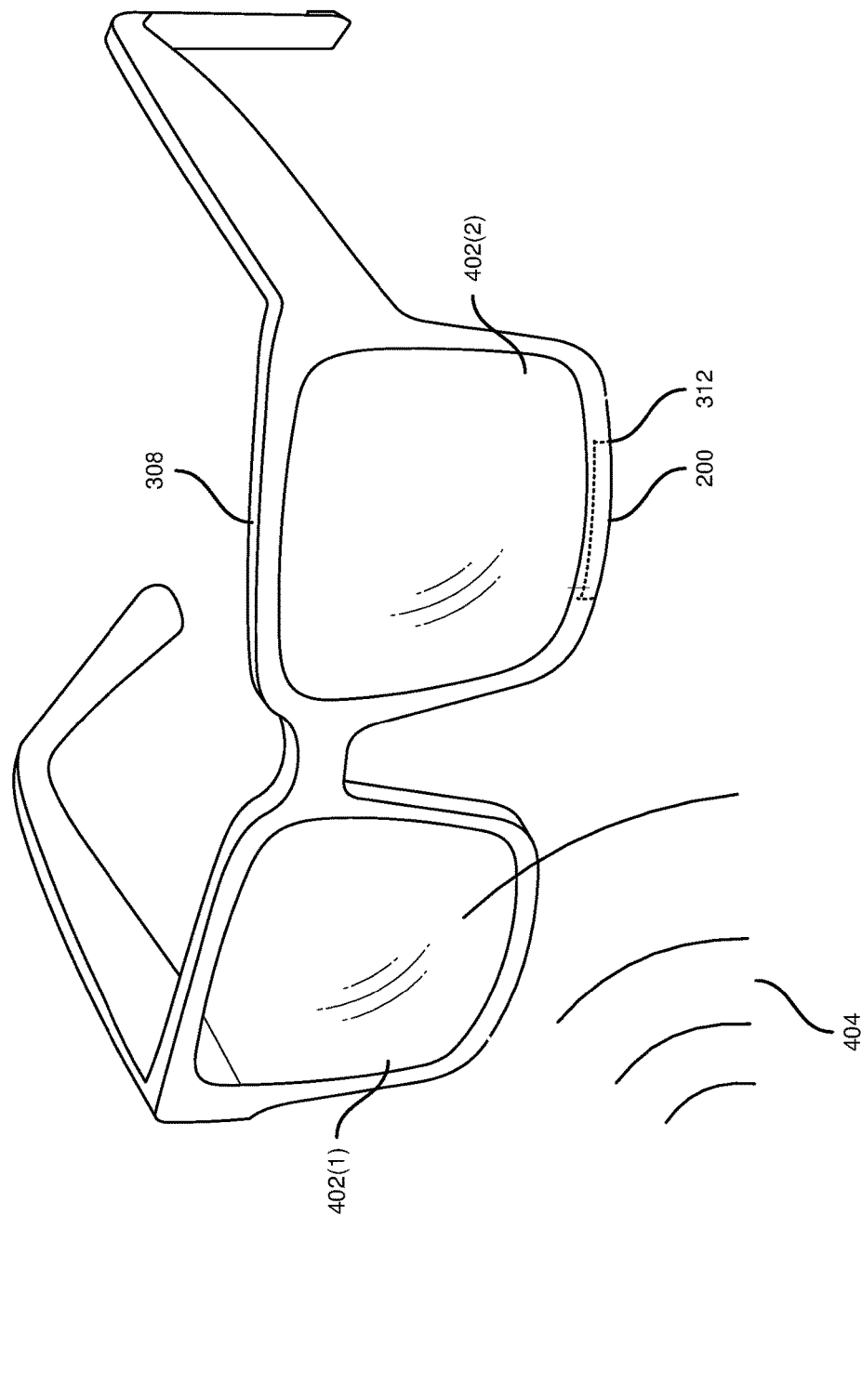
FIG. 4 is a perspective view of an exemplary computing device with an exemplary integrated swappable antenna component covered by the exemplary overmold window.

FIG. 4 illustrates a perspective view of an exemplary computing device 400 with an integrated swappable antenna component covered by overmold window 200. As illustrated in FIG. 4, swappable antenna component 100 may not be visible from the outside of computing device 400 when covered by overmold window 200. In some embodiments, computing device 400 may generally represent any type or form of computing device capable of sending and/or receiving signals. Examples of computing device 400 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device.

In one embodiment, computing device 400 may include frame 308, which may be dimensioned to encompass electronic components such as swappable antenna component 100 of FIG. 1. Additionally, frame 308 may include a gap to enable electronic components to be assembled inside frame 308, and overmold window 200 may then be overmolded to the gap of frame 308 to close the exterior surface. In this embodiment, frame 308 may include a metallic material, such as magnesium, and a plastic polymer of overmold window 200 may be molded directly to the metal to eliminate potential seams. In addition, the pliable material may then be applied to overmold window 200 to reduce seam 312 between overmold window 200 and frame 308 and improve both ingress protection and a uniform cosmetic look.

Figure 9:
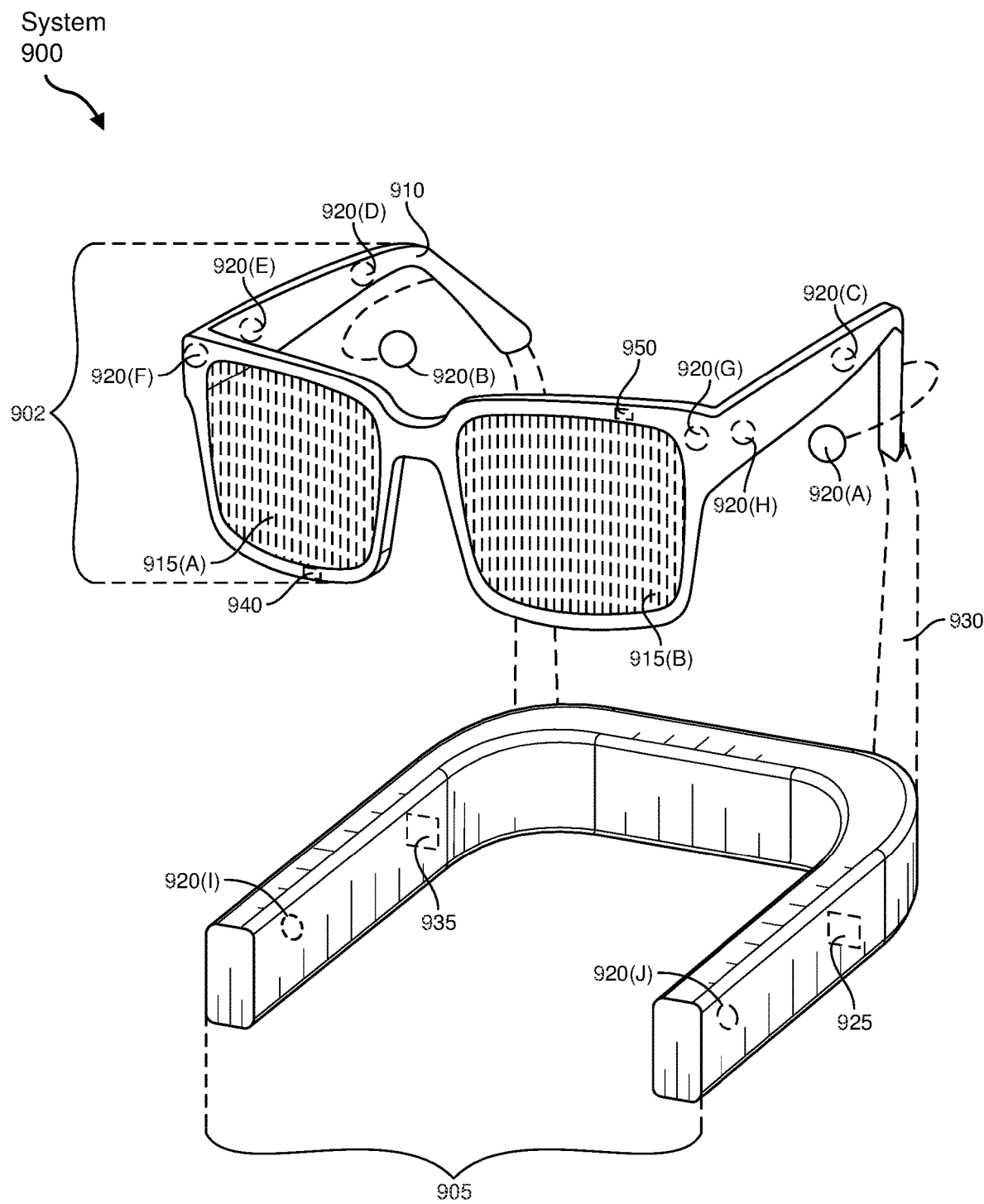
FIG. 9 is an illustration of exemplary augmented-reality glasses that may be used in connection with embodiments of this disclosure.
Figure 10:
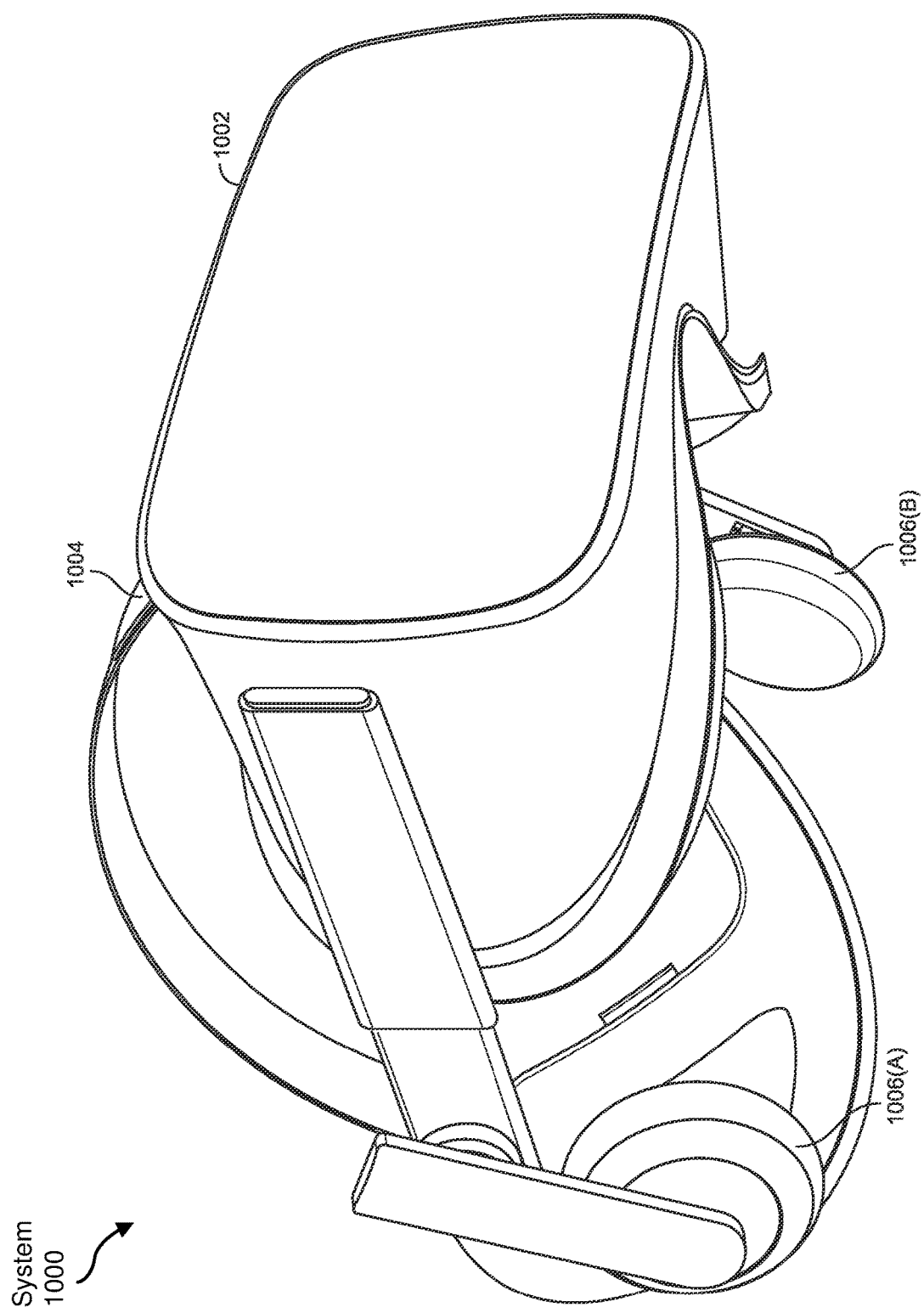
FIG. 10 is an illustration of an exemplary virtual-reality headset that may be used in connection with embodiments of this disclosure.

In the example of FIG. 4, computing device 400 may represent a pair of artificial reality (AR) or virtual reality (VR) glasses, such as eyewear device 902 of FIG. 9, with lenses 402(1) and 402(2). In this example, swappable antenna component 100 may represent sensor 940 of FIG. 9 and may be contained within frame 308 of FIG. 4 or disposed along an interior circumference of frame 308. Additionally, antenna trace 104 of swappable antenna component 100, such as in FIG. 3, may be shaped to function as an antenna to detect an electromagnetic signal 404 for computing device 400. In these examples, electromagnetic signal 404 may represent a local network signal such as near-field communication (NFC) signals, a wireless broadband signal such as Long-Term Evolution (LTE) or 5G signals, and/or any other suitable type of signal for communicating data.

In the above example, overmold window 200 may include a material that permits swappable antenna component 100 to detect electromagnetic signal 404 through the material. In this example, the material of overmold window 200 may not exceed a maximum limit of a dielectric constant and a maximum limit of a dissipation factor. The terms "dielectric constant" and "permittivity" may refer to the ability of a material to be polarized or permeated by electric charge. The terms "dissipation factor" and "loss tangent" may refer to a measure of loss of energy traveling through a material. Materials with properties of lower permittivity and lower loss tangents may be better suited to enable electromagnetic signals to penetrate the materials and avoid interference.

For example, polyphenylene sulfide (PPS) may be selected to provide dimensional stability and thermal stability and may be filled with 30% glass fibers for stiffness. In this example, plastics such as PPS may have a lower dielectric constant than other materials, such as glass, and may be best suited for molding into overmold window 200. Similarly, plastic materials may also have lower dissipation factors. Additionally, materials of other components, such as liquid adhesive 306 used to bond swappable antenna component 100 to overmold window 200, may also be selected for lower dielectric constants and/or lower dissipation factors.

Figure 5:
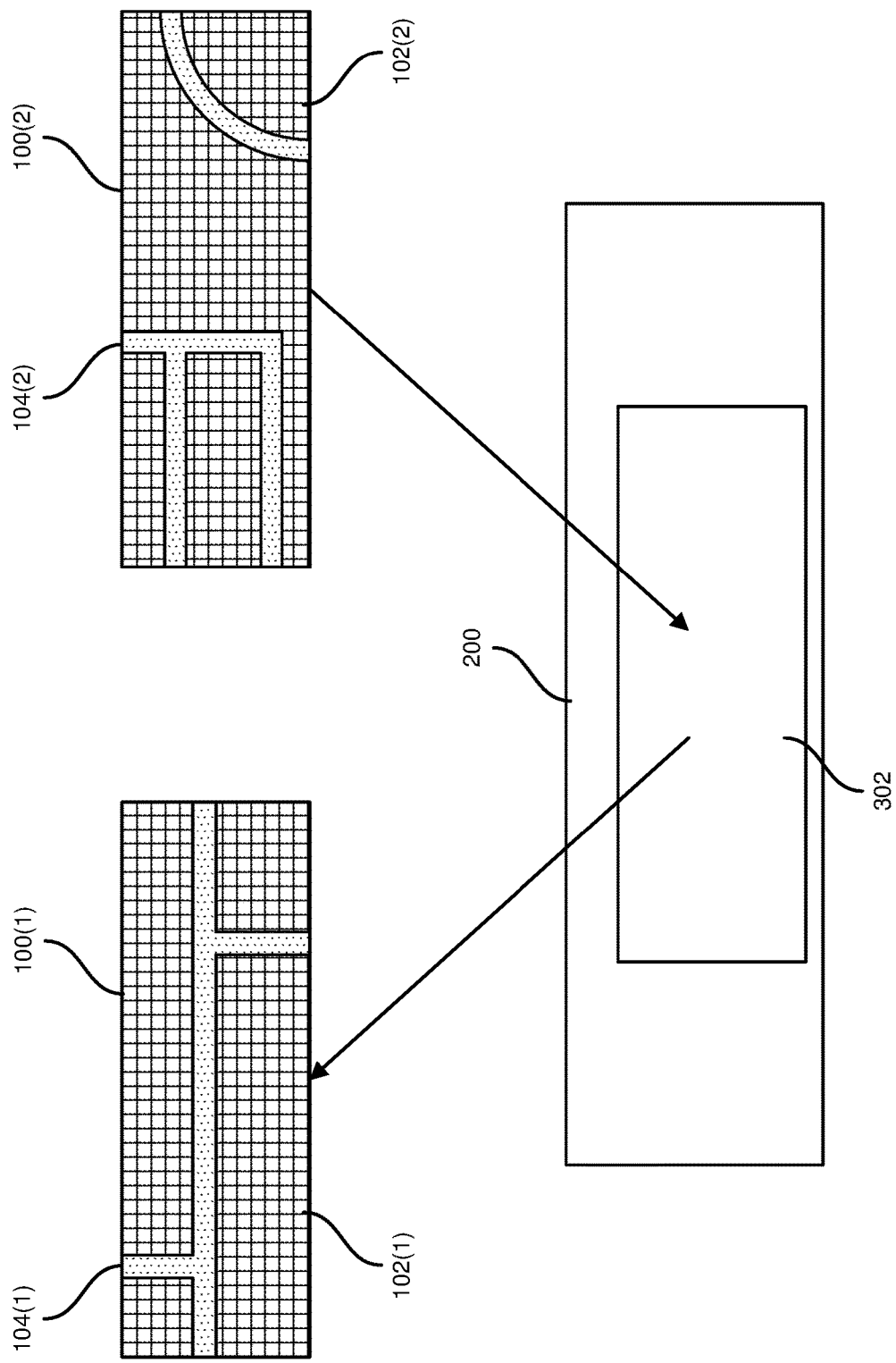
FIG. 5 is an illustration of an exemplary swapping of one exemplary swappable antenna component for a second exemplary swappable antenna component.

FIG. 5 illustrates an exemplary swapping of a first swappable antenna component 100(1) for a second swappable antenna component 100(2). In this example, swappable antenna component 100(1) may be bonded to interior surface 302 of overmold window 200 such that swappable antenna component 100(1) is replaceable with alternate swappable antenna component 100(2). For example, swappable antenna components 100(1) and 100(2) may both comprise LDS inserts with similar dimensions for carriers 102(1) and 102(2) to fit in overmold window 200. However, in this example, an antenna trace 104(1) of swappable antenna component 100(1) may differ from an antenna trace 104(2) of swappable antenna component 100(2). Thus, the swapping of swappable antenna components 100(1) and 100(2) enables design flexibility for antenna traces that are not constrained by frame 308 of FIG. 4. Additionally, swappable antenna components 100(1) and 100(2) may be designed and manufactured separately from a frame manufacturer and may be more easily updated.

Figure 6:
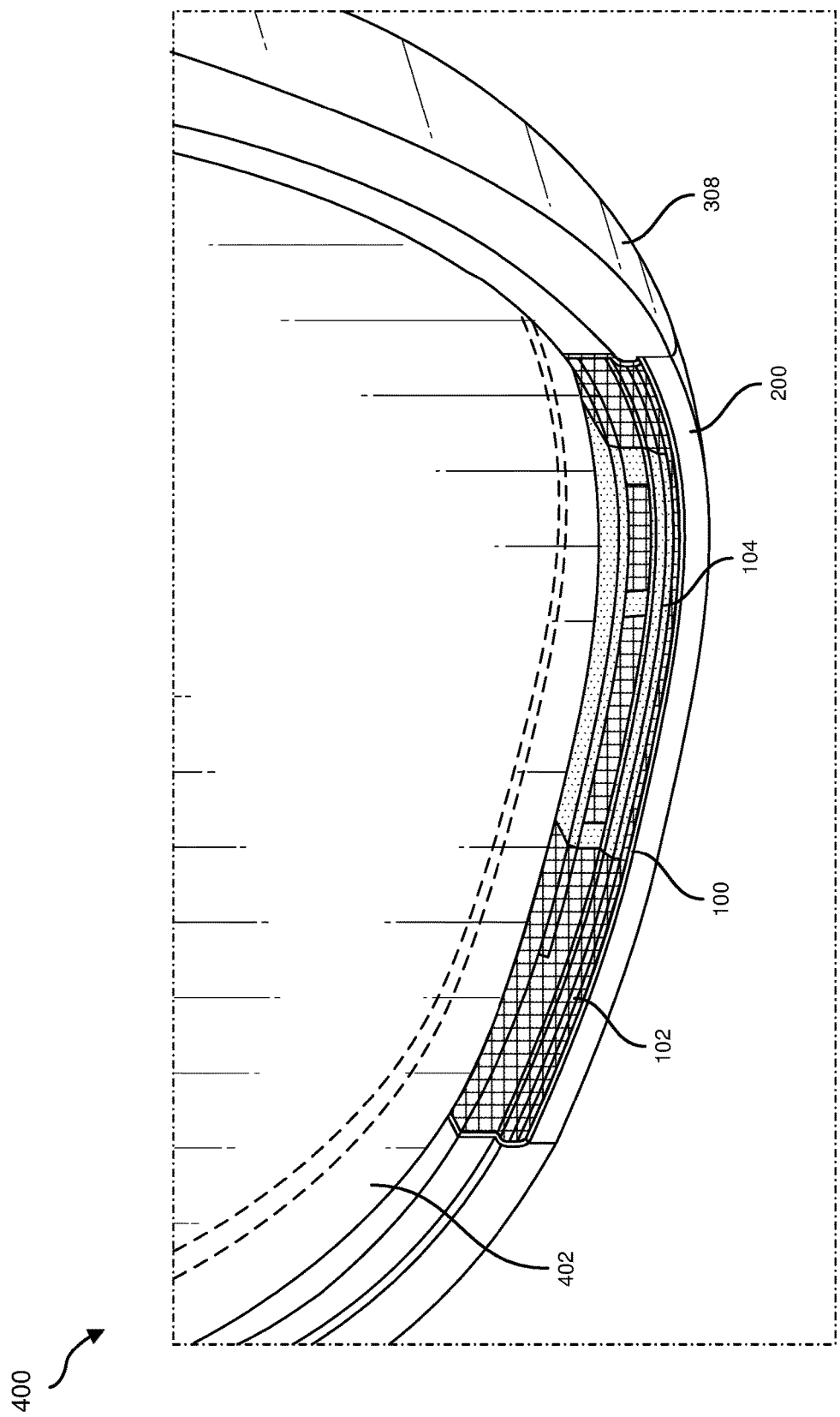
FIG. 6 is a cross-sectional view of the exemplary swappable antenna component supporting a lens held by the exemplary frame.

FIG. 6 illustrates a cross-sectional view of computing device 400 with swappable antenna component 100 supporting a lens 402 held by frame 308. In one embodiment, swappable antenna component 100 with carrier 102 and antenna trace 104 may be dimensioned to support lens 402 when bonded to overmold window 200. In this embodiment, swappable antenna component 100 may be disposed on the interior circumference of frame 308 and be positioned in contact with an edge of lens 402 that extends into frame 308. Additionally, lens 402 may represent a prescription lens, and carrier 102 may be molded to hold a thicker or thinner lens based on the dimensions of lens 402.

Figure 7:
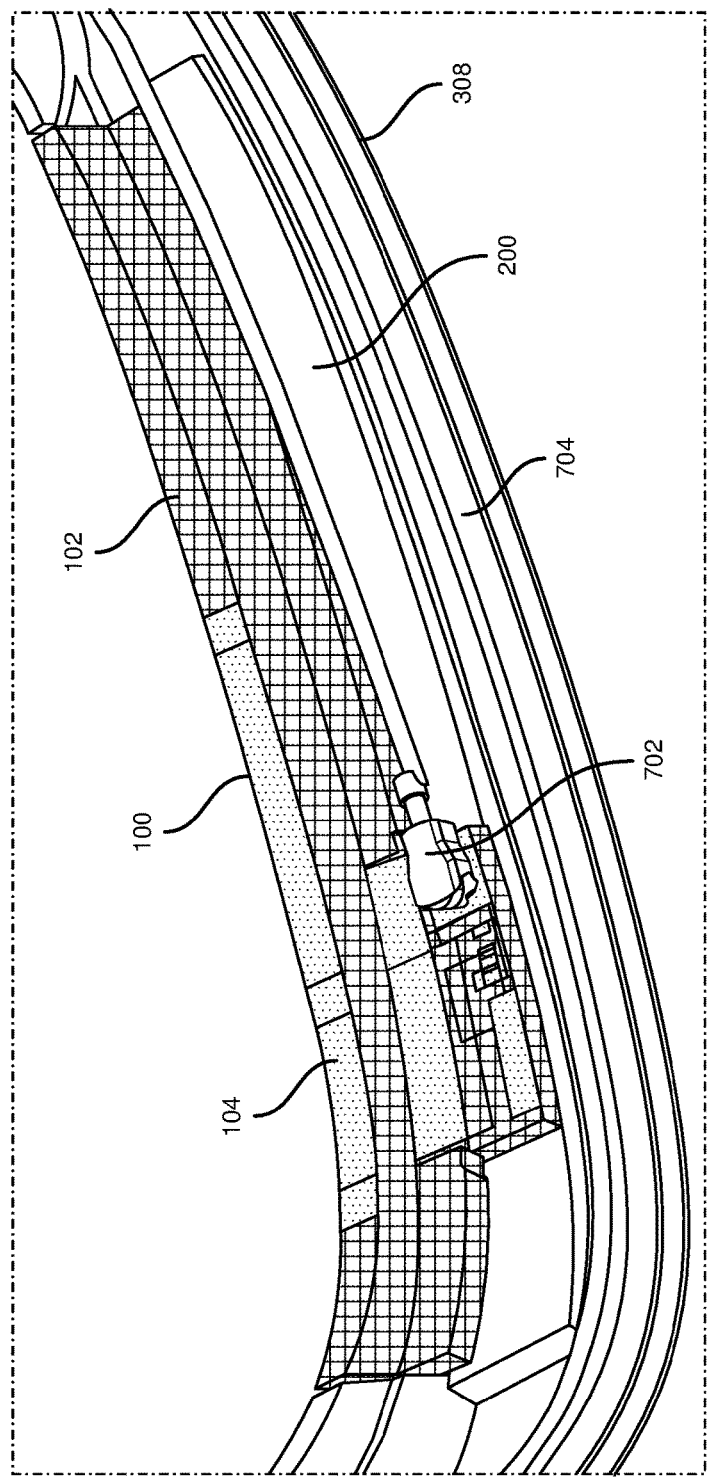
FIG. 7 is an illustration of exemplary electronic components and an exemplary bumper of the exemplary computing device.

FIG. 7 illustrates exemplary electronic components 702 and an exemplary non-conductive bumper 704 of computing device 400 of FIG. 4. As shown in FIG. 7, swappable antenna component 100 may include carrier 102 and antenna trace 104, with antenna trace 104 electronically coupled to computing device 400. In this example, frame 308 may be dimensioned to encompass electronic components 702, and swappable antenna component 100 may be electronically coupled to electronic components 702. For example, electronic components 702 may represent a connector attaching a cable to antenna trace 104, with the other end of the cable connected to circuitry in frame 308. In this example, electromagnetic signal 404 of FIG. 4 may be detected by swappable antenna component 100 and sent to the circuitry, such as to a printed circuit board (PCB) via electronic components 702.

In one embodiment, computing device 400 may include non-conductive bumper 704 coupled to frame 308 to provide a buffer between a user and electronic components, such as electronic components 702 and/or swappable antenna component 100. In this embodiment, non-conductive bumper 704 may comprise a non-conductive material designed to prevent the user from feeling conduction from components such as swappable antenna component 100. As shown in FIG. 7, swappable antenna component 100 may be disposed at a side of frame 308 facing away from a user while wearing computing device 400, and non-conductive bumper 704 may be disposed at a side of frame 308 toward the user's face.

Figure 8:
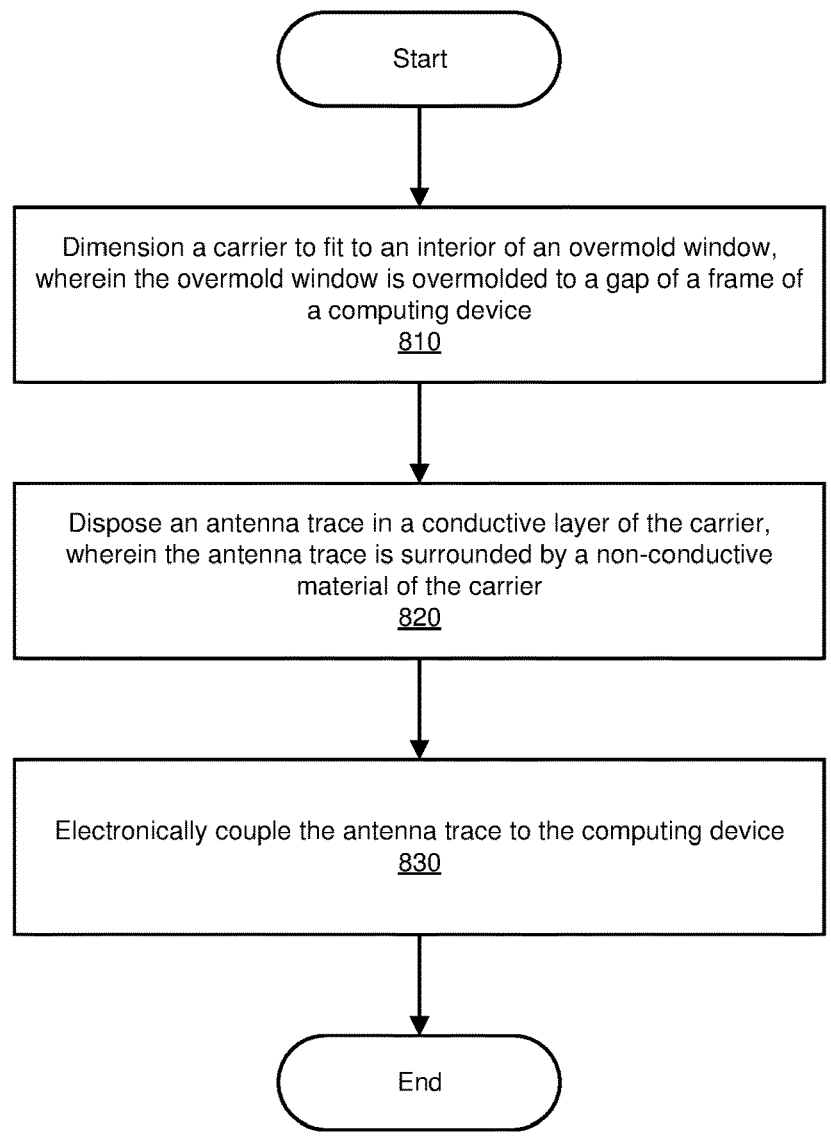
FIG. 8 is a flow diagram of an exemplary method for manufacturing a swappable antenna component.

FIG. 8 shows an example method for manufacturing, assembling, using, adjusting, or otherwise configuring or creating the systems and apparatuses presented herein. The steps shown in FIG. 8 may be performed by any individual and/or by any suitable type or form of manual and/or automated apparatus. In particular, FIG. 8 illustrates a flow diagram of an exemplary method 800 for manufacturing coil-integrated housing components.

As shown in FIG. 8, at step 810 one or more of the systems described herein may dimension a carrier to fit to an interior of an overmold window, wherein the overmold window may be overmolded to a gap of a frame of a computing device. For example, as illustrated in FIG. 6, carrier 102 may be dimensioned to fit to an interior of overmold window 200, and overmold window 200 may be overmolded to a gap of frame 308 of computing device 400.

The systems described herein may perform step 810 in a variety of ways. In one example, a non-conductive material may be injection molded to a mold dimensioned to fit inside overmold window 200 to create carrier 102. In this example, carrier 102 may be manufactured independently of frame 308. Additionally, overmold window 200 may be overmolded directly to frame 308 to cover a gap left in the manufacturing of frame 308. In this example, overmold window 200 may be applied by a frame supplier, without changing the supply chain, to meet cosmetic and sealing requirement or standards to protect electronic components in frame 308.

Returning to FIG. 8, at step 820, one or more of the systems described herein may dispose an antenna trace in a conductive layer of the carrier. The antenna trace may be surrounded by a non-conductive material of the carrier. For example, as illustrated in FIG. 5, antenna traces 104(1) and 104(2) may be disposed in conductive layers of carriers 102(1) and 102(2) to be surrounded by non-conductive material of carriers 102(1) and 102(2).

The systems described herein may perform step 820 in a variety of ways. In some embodiments, the disclosed methods may dispose the antenna trace in the conductive layer of the carrier by laser-sintering a shape of the antenna trace into the carrier and, subsequently, by immersing the carrier in an electroplating bath such that a conductive material adheres to the antenna trace. In some examples, the term "laser-sintering" may refer to a process of compacting solid material using a laser. For example, swappable antenna component 100(1) of FIG. 5 may represent an LDS insert, and the disclosed methods may laser-sinter or laser-etch a design of antenna trace 104(1) into injection-molded carrier 102(1).

In some examples, the term "electroplating" may refer to a process of applying a conductive coating, such as a metal, to a component. In these examples, the term "electroplating bath" may refer to a bath of liquid conductive material used in the process of submerging a component to apply an electroplating layer. In the above example, the disclosed methods may then immerse carrier 102(1) into an electroplating bath, such as a copper bath. In this example, the conductive material or copper may only adhere to the trace design laser-activated during the laser-sintering process to create antenna trace 104(1).

In alternative embodiments, the disclosed methods may dispose the antenna trace in the conductive layer of the carrier by extruding the antenna trace from the conductive layer of the carrier and molding the non-conductive material around the antenna trace. For example, swappable antenna component 100(2) of FIG. 5 may include a piece of conductive sheet metal with antenna trace 104(2) extruded from the conductive sheet metal. In this example, non-conductive material such as plastic may be insert molded around the sheet metal to create a form for carrier 102(2) around antenna trace 104(2).

Returning to FIG. 8, at step 830, one or more of the systems described herein may electronically couple the antenna trace to the computing device. For example, as illustrated in FIG. 7, antenna trace 104 may be electronically coupled to computing device 400 via a cable and connector.

The systems described herein may perform step 830 in a variety of ways. In one embodiment, a connector may be positioned in contact with the conductive material of antenna trace 104, after swappable antenna component 100 is bonded to overmold window 200 in frame 308, and then connected to other electronic components of computing device 400, such as via electronic components 702 of FIG. 7. In other embodiments, swappable antenna component 100 may be positioned in frame 308 antenna trace 104 comes into contact with electronic components when swappable antenna component 100 is bonded to overmold window 200, electronically coupling antenna trace 104 without additional steps.

In some examples, method 800 may further include a step to apply a pliable material to the overmold window to reduce a seam between the overmold window and the frame and to polish the pliable material such that an exterior surface of the overmold window is flush with an exterior surface of the frame. For example, a pliable material such as putty may be applied to seam 312 of FIG. 3 to fill seam 312 and cover potential venues of ingress into frame 308. The disclosed methods may then polish the pliable material to ensure a smooth exterior of frame 308. In this example, the pliable material may then be polished to remove excess material until the pliable material is flush with overmold window 200 and frame 308. Additionally, the disclosed methods may paint over the pliable material, frame 308, and overmold window 200 to create a uniform look and eliminate the visibility of seam 312, such as with computing device 400 of FIG. 4.

As discussed throughout the present disclosure, the disclosed methods, systems, and apparatuses may provide one or more advantages over alternative methods of incorporating an antenna into a computing device. For example, methods to overmold an LDS insert to the frame of a pair of AR or VR glasses may cause the copper plating of the antenna to stick to metal frame material. Similar methods to bond an antenna component to the perimeter of a computing device may cause sealing issues that let in dust or water and/or may create a seam that disrupts a visual aesthetic of the device. Other methods may necessitate the redesign of a frame each time the antenna component is redesigned. In addition, these methods may disrupt a supply chain flow of manufacturing the computing device. For example, a partially finished frame may be transferred to an antenna supplier to attach the antenna and, subsequently, back to the manufacturer to complete the assembly.

In contrast, the disclosed methods enable changes to an antenna pattern while maintaining a seal at the exterior of the computing device. Specifically, by separately manufacturing an antenna component designed to fit an overmold window, the disclosed methods may enable new antenna designs to be implemented without having to redesign the frame. By overmolding the overmold window directly to the frame and bonding the antenna component to the interior of the overmold window, the disclosed methods may also eliminate seams created by the antenna component and protect electronic components in the frame with the overmold window. Additionally, by apply putty in a seam between the overmold window and the frame, the disclosed methods may further reduce the appearance and ingress of potential seams. Furthermore, the disclosed methods enable the antenna component to be manufactured independently of the frame and overmold window, which avoids disrupting the supply chain. Thus, the methods, systems, and apparatuses described herein may improve the integration of a flexible antenna design into a computing device.

EXAMPLE EMBODIMENTS

Example 1: A swappable antenna component may include 1) a carrier dimensioned to fit to an interior of an overmold window, wherein the overmold window is overmolded to a gap of a frame of a computing device, and 2) an antenna trace disposed in a conductive layer of the carrier to electronically couple to the computing device, wherein the antenna trace is surrounded by a non-conductive material of the carrier.

Example 2: The swappable antenna component of Example 1, wherein the carrier may be dimensioned to fit to the interior of the overmold window such that the carrier fits within the gap of the frame and is covered by the overmold window.

Example 3: The swappable antenna component of any of Examples 1 and 2, wherein the carrier may be bonded to an interior surface of the overmold window with a liquid adhesive.

Example 4: The swappable antenna component of any of Examples 1-3, wherein the carrier may include the non-conductive material injection molded to fit the interior of the overmold window.

Example 5: The swappable antenna component of any of Examples 1-4, wherein the antenna trace may include a conductive material shaped to function as an antenna to detect an electromagnetic signal for the computing device.

Example 6: A computing device may include 1) a frame dimensioned to encompass electronic components, 2) an overmold window overmolded to a gap of the frame such that an exterior surface of the overmold window is flush with an exterior surface of the frame, and 3) a swappable antenna component bonded to an interior surface of the overmold window, wherein the swappable antenna component is electronically coupled to the electronic components.

Example 7: The computing device of Example 6, wherein a pliable material may be applied to the overmold window to reduce a seam between the overmold window and the frame.

Example 8: The computing device of any of Examples 6 and 7, wherein the overmold window may include an interlocking element dimensioned to increase a structural bond with the frame.

Example 9: The computing device of any of Examples 6-8, wherein the overmold window may include a material that permits the swappable antenna component to detect an electromagnetic signal through the material.

Example 10: The computing device of any of Examples 6-9, wherein the material of the overmold window may not exceed a maximum limit of a dielectric constant and/or a maximum limit of a dissipation factor.

Example 11: The computing device of any of Examples 6-10, wherein the swappable antenna component may include a conductive material that functions as an antenna to detect the electromagnetic signal.

Example 12: The computing device of any of Examples 6-11, wherein the swappable antenna component may be dimensioned to fit to an interior of the overmold window such that the swappable antenna component fits within the gap of the frame and is covered by the overmold window.

Example 13: The computing device of any of Examples 6-12, wherein the swappable antenna component may be bonded to the interior surface of the overmold window such that the bonding eliminates a seam along the exterior surface of the frame.

Example 14: The computing device of any of Examples 6-13, wherein the swappable antenna component may be bonded to the interior surface of the overmold window such that the swappable antenna component is replaceable with an alternate swappable antenna component.

Example 15: The computing device of any of Examples 6-14, wherein the swappable antenna component may be dimensioned to support a lens held by the frame.

Example 16: The computing device of any of Examples 6-15, wherein the computing device may further include a non-conductive bumper coupled to the frame to provide a buffer between a user and the electronic components.

Example 17: A method of manufacturing may include 1) dimensioning a carrier to fit to an interior of an overmold window, wherein the overmold window is overmolded to a gap of a frame of a computing device, 2) disposing an antenna trace in a conductive layer of the carrier, wherein the antenna trace is surrounded by a non-conductive material of the carrier, and 3) electronically coupling the antenna trace to the computing device.

Example 18: The method of Example 17, wherein disposing the antenna trace in the conductive layer of the carrier may include laser-sintering a shape of the antenna trace into the carrier and immersing the carrier in an electroplating bath such that a conductive material adheres to the antenna trace.

Example 19: The method of any of Examples 17 and 18, wherein disposing the antenna trace in the conductive layer of the carrier may include extruding the antenna trace from the conductive layer of the carrier and molding the non-conductive material around the antenna trace.

Example 20: The method of any of Examples 17-19, wherein the method may further include applying a pliable material to the overmold window to reduce a seam between the overmold window and the frame and polishing the pliable material such that an exterior surface of the overmold window is flush with an exterior surface of the frame.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality system 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light processing (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
   a frame dimensioned to encompass electronic components;
   an overmold window overmolded to a gap of the frame to cover the gap such that an exterior surface of the overmold window is flush with an exterior surface of the frame; and
   a swappable antenna component bonded to an interior surface of the overmold window, wherein the swappable antenna component is electronically coupled to the electronic components, the swappable antenna component comprising:
   a carrier dimensioned to fit to an interior of the overmold window; and
   an antenna trace disposed in a conductive layer of the carrier.

2. The computing device of claim 1, wherein a pliable material is applied to the overmold window to reduce a seam between the overmold window and the frame.

3. The computing device of claim 1, wherein the overmold window comprises an interlocking element dimensioned to increase a structural bond with the frame.

4. The computing device of claim 1, wherein the overmold window comprises a material that permits the swappable antenna component to detect an electromagnetic signal through the material.

5. The computing device of claim 4, wherein the material of the overmold window does not exceed:
   a maximum limit of a dielectric constant; and
   a maximum limit of a dissipation factor.

6. The computing device of claim 4, wherein the swappable antenna component comprises a conductive material that functions as an antenna to detect the electromagnetic signal.

7. The computing device of claim 1, wherein the swappable antenna component is dimensioned to fit to an interior of the overmold window such that the swappable antenna component:
   fits within the gap of the frame; and
   is covered by the overmold window.

8. The computing device of claim 1, wherein the swappable antenna component is bonded to the interior surface of the overmold window such that the bonding eliminates a seam along the exterior surface of the frame.

9. The computing device of claim 1, wherein the swappable antenna component is bonded to the interior surface of the overmold window such that the swappable antenna component is replaceable with an alternate swappable antenna component.

10. The computing device of claim 1, wherein the swappable antenna component is dimensioned to support a lens held by the frame.

11. The computing device of claim 1, further comprising a non-conductive bumper coupled to the frame to provide a buffer between a user and the electronic components.

\* \* \* \* \*